UNITED STATES PATENT OFFICE.

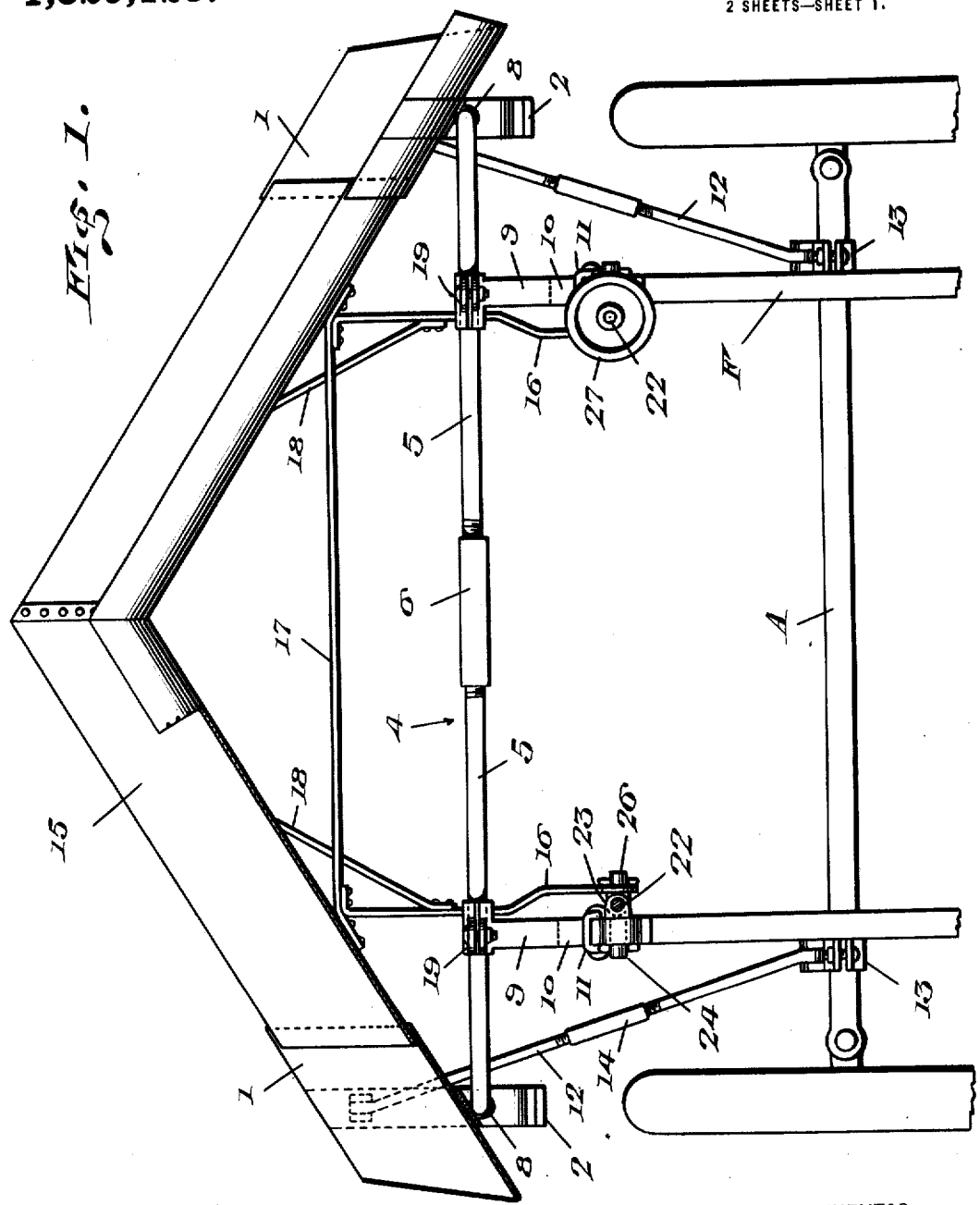

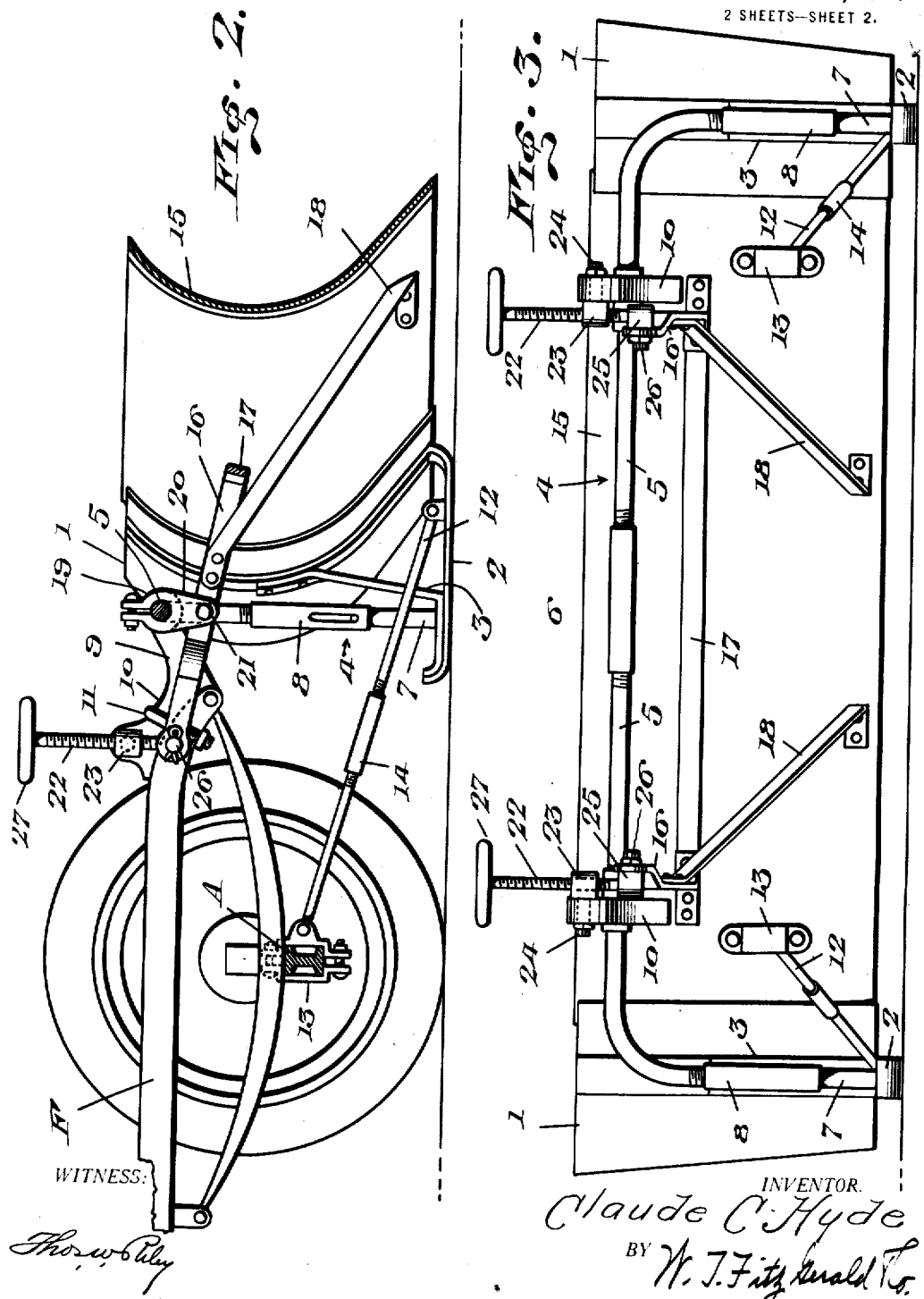

CLAUDE C. HYDE, OF OTISVILLE, NEW YORK.

SNOWPLOW.

1,329,123.   Specification of Letters Patent.   Patented Jan. 27, 1920.

Application filed April 22, 1919. Serial No. 291,842.

*To all whom it may concern:*

Be it known that I, CLAUDE C. HYDE, a citizen of the United States, residing at Otisville, in the county of Orange and State of New York, have invented certain new and useful Improvements in Snowplows; and I do hereby declare the following to be a full, clear, and exact description of the invention, such as will enable others skilled in the art to which it appertains to make and use the same.

The present invention relates to snow plows, and aims to provide a novel and improved means for mounting a snow plow at the front of an automobile, in order to deflect snow from in front of the machine, the present improvement being used in connection with the wheel plows disclosed in my Patent No. 1,199,075, granted September 26, 1916.

A further object is the provision in combination with plows in front of the wheels of the vehicle, a center plow coöperating with the wheel plows to clear the road at the center as well as in front of the wheels, said center plow being adjustable independent of the wheel plows so that the snow can be removed from the center to any desired depth.

A still further object is the provision of novel means for adjustably supporting the center plow from the forward end of the automobile frame, in order that the center plow can be conveniently supported in various vertical positions.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein—

Figure 1 is a plan view of the attachment as applied to the forward end of the automobile frame, portions being broken away and shown in section.

Fig. 2 is a longitudinal central vertical section.

Fig. 3 is a rear view of the attachment.

The present attachment includes wheel plows 1 mounted somewhat the same as disclosed in said patent, being supported on runners or shoes 2 intended to ride on the snow, and braces 3 are provided between the plows 1 and runners 2 to make the parts rigid. An arch 4 is provided for supporting the runners 2, and embodies the rods 5 connected adjustably at their adjacent ends by a turn buckle sleeve 6, and said arch includes posts 7 projecting upwardly from the shoes 2 and slidably connected to the downturned opposite ends of the rods 5 by the turn buckle sleeves 8. Thus, by rotating the sleeve 6, this will adjust the length of the arch 4 to position the plows 1 laterally as desired in front of the front wheels of the vehicle, and by adjusting the sleeves 8, this will raise and lower the plows 1 with the runners or shoes 2. The rods 5 provide a bumper when the plows 1 are removed, together with the shoes 2 and sleeves 8. The arch 4 is supported by forwardly projecting brackets 9 having portions 10 shaped to fit on the forward ends of the side channels or beams of the automobile frame F, and the portions 10 are secured to the frame by means of the U-bolts 11 or the like. Brace rods 12 are pivotally connected at their forward ends to the runners 2 near the forward ends of said runners, and the rear ends of said rods are pivoted to clamps 13 adapted to embrace the front axle A, said rods having turn buckle sleeves 14 for purpose of adjustment. The structure so far described is similar to that disclosed in said patent, so that further detailed description thereof is not necessary.

Coming to the present invention, the same includes a V-shaped plow 15 having its wings diverging rearwardly toward opposite sides and overlapping the plows 1 in front of same, whereby the snow deflected toward the opposite sides by the plow 15 will be deflected across the plows 1. Thus, the plows 1 will deflect the snow from in front of the wheels of the vehicle to the desired depth, while the plow 15 will clear the road at the center between the wheels. The plow 15 is supported by a pair of longitudinal levers or members 16 having their forward ends secured to a transverse stay bar 17 secured to the wings of the plow 15 in rear thereof, and the levers 16 are also connected to the plow 15 by braces 18 to render the structure rigid. The brackets 9 have clamps 19 through which the rods 5 pass to be held by said clamps, and said clamps have rigid hangers or depending portions 20 to which the levers 16 are pivoted between their ends, as at 21, whereby the forward ends of said levers can swing upwardly and downwardly for raising and lowering the plow 15 as desired.

The means for adjusting the position of the plow 15 includes vertical screws 22 threaded through nuts 23 which are pivoted, as at 24, to the portions 10 of the brackets 9, and the lower ends of the screws 22 are swiveled to members 25 that are pivoted, as at 26, to the rear ends of the levers 16. The screws 22 have handles 27 at their upper ends, whereby they can be turned, and when said screws are threaded downwardly, the plow 15 will be raised and supported at the desired position.

The wheel plow 1 can be adjusted vertically in order to clear the snow from in front of the wheels to the desired depth, and the plow 15 can also be adjusted vertically independent of the plows 1 so as to clear the snow from in front of the center of the machine. The plow 15 can be lowered so as to rest on the plows 1 if the snow is not too deep, and the machine has sufficient power to clear the plows through the snow, and if the snow is too deep and the plow 15 interferes with the propulsion of the vehicle, then it can be raised so as to only deflect the snow to a desired depth, while the plows 1 deflect the snow deeper down in front of the wheels. At any position of the plow 15, the snow deflected thereby will pass across the plows 1 to the opposite sides out of the way, and it has been found that when traveling even at moderate speed, the plows 1 and 15 will throw the snow over the ditches and fences along the road.

Having thus described the invention, what is claimed as new is:—

1. A plow attachment for motor vehicles embodying brackets having means for attachment to the forward end of the vehicle, a pair of runners to be disposed in front of the wheels of the vehicle, wheel plows mounted on said runners to deflect the snow toward opposite sides from in front of said wheels, means for connecting said runners and plows to said brackets for guiding said runners and plows for vertical motion, a V-shaped center plow having its ends extending in front of the wheel plows in overlapping relation, and means for supporting said center plow from said brackets for adjusting the center plow vertically in front of the wheel plows and supporting said center plow independent of the wheel plows.

2. A plow attachment for motor vehicles embodying brackets having means for attachment to the forward end of the vehicle, a pair of runners to be disposed in front of the wheels of the vehicle, wheel plows mounted on said runners to deflect the snow toward opposite sides from in front of said wheels, means for connecting said runners and plows to said brackets for guiding said runners and plows for vertical motion, a V-shaped center plow having its ends extending in front of the wheel plows in overlapping relation, levers pivotally connected with said brackets and extending forwardly and secured to said V-shaped plow, and means between said levers and brackets for adjusting the levers to raise and lower said V-shaped plow.

In testimony whereof I have signed my name to this specification in the presence of two subscribing witnesses.

CLAUDE C. HYDE.

Witnesses:
   HENRY A. HOLLEY,
   HORACE F. PATTERSON.